(12) United States Patent
Yoshida et al.

(10) Patent No.: US 11,333,348 B2
(45) Date of Patent: May 17, 2022

(54) EXHAUST GAS COOLER

(71) Applicant: Mitsubishi Heavy Industries Engineering, Ltd., Kanagawa (JP)

(72) Inventors: Kaori Yoshida, Tokyo (JP); Moritoshi Murakami, Tokyo (JP); Ayumu Yamazaki, Tokyo (JP); Rikio Kan, Hiroshima (JP); Kiyotaka Kunimune, Hiroshima (JP); Koji Nakayama, Hiroshima (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 0 days.

(21) Appl. No.: 16/976,415

(22) PCT Filed: Feb. 22, 2019

(86) PCT No.: PCT/JP2019/006823
§ 371 (c)(1),
(2) Date: Aug. 27, 2020

(87) PCT Pub. No.: WO2019/167836
PCT Pub. Date: Sep. 6, 2019

(65) Prior Publication Data
US 2021/0048187 A1    Feb. 18, 2021

(30) Foreign Application Priority Data
Mar. 1, 2018 (JP) .............................. JP2018-036507

(51) Int. Cl.
*F01K 23/06* (2006.01)
*F22B 1/18* (2006.01)

(52) U.S. Cl.
CPC .................................. *F22B 1/1807* (2013.01)

(58) Field of Classification Search
CPC ........ F22B 1/18; F22B 1/1807; F22B 1/1823; F22B 1/1861; F01K 23/06; F01K 23/067;
(Continued)

(56) References Cited

U.S. PATENT DOCUMENTS 5,326,081 A * 7/1994 Arpalahti ................. F27D 9/00
266/155
2001/0025609 A1* 10/2001 Liebig ...................... F22D 1/12
122/406.1

FOREIGN PATENT DOCUMENTS

CN     106051735 A    10/2016
CN     107208876 A     9/2017
(Continued)

OTHER PUBLICATIONS

The First Examination Report dated Apr. 7, 2021, issued in counterpart IN application No. 202017033618 (6 pages).
(Continued)

*Primary Examiner* — Gregory A Wilson
(74) *Attorney, Agent, or Firm* — Osha Bergman Watanabe & Burton LLP

(57) ABSTRACT

An exhaust gas cooler includes: a steam drum containing first water; an economizer for heat exchange between exhaust gas and the first water supplied from the steam drum; and a feedwater pipe for supplying the first water with second water having a lower temperature than the first water. The exhaust gas cooler is configured such that the first water flowing out of the economizer is introduced into the steam drum. The second water is divided and supplied to the first water flowing out of the economizer and the first water flowing into the economizer.

3 Claims, 3 Drawing Sheets

(58) Field of Classification Search
CPC ....... Y02E 20/16; B01D 53/34; Y10S 261/09; F23J 2219/00; F23J 2900/00
See application file for complete search history.

(56) References Cited

FOREIGN PATENT DOCUMENTS

| | | | |
|---|---|---|---|
| CN | 107250666 | A | 10/2017 |
| DE | 2821397 | A1 | 11/1979 |
| EP | 1898056 | A1 | 3/2008 |
| JP | H03-241204 | A | 10/1991 |
| JP | H09-236207 | A | 9/1997 |
| JP | 2007-248017 | A | 9/2007 |
| JP | 2009-162449 | A | 7/2009 |
| JP | 5117197 | B2 | 1/2013 |
| JP | 5128624 | B2 | 1/2013 |
| JP | 2015-010798 | A | 1/2015 |
| JP | 2015-096784 | A | 5/2015 |
| JP | 2016-148467 | A | 8/2016 |
| JP | 2016-148468 | A | 8/2016 |
| JP | 2017-179113 | A | 10/2017 |

OTHER PUBLICATIONS

The extended European Search Report dated Mar. 10, 2021, issued to the corresponding EP application No. 19760806.0 (8 pages).
International Search Report issued in corresponding International Application No. PCT/JP2019/006823, dated Apr. 9, 2019 (12 pages).
International Preliminary Report on Patentability issued in corresponding International Application No. PCT/JP2019/006823, dated Sep. 10, 2020 (22 pages).
The Office Action dated Aug. 4, 2021, issued in counterpart CN application No. 201980009421.1 (6 pages).
The Decision of Refusal issued in counterpart JP application No. 2018-036507, dated Feb. 8, 2022 (8 pages).

* cited by examiner

EXHAUST GAS COOLER

TECHNICAL FIELD

The present disclosure relates to an exhaust gas for cooling exhaust gas.

BACKGROUND

An exhaust gas cooler for cooling exhaust gas is provided with an economizer for heat exchange between the exhaust gas and feed water. When the dew point temperature of the exhaust gas is high, the temperature of the exhaust gas may fall below the dew point temperature due to heat exchange in the economizer, and dew condensation may occur. In the case of corrosive exhaust gas, the condensation of the exhaust gas may lead to corrosion of the economizer.

In an economizer disclosed in Patent Document 1, prior to supplying water to a steam-water drum, all the water is introduced into the economizer to perform heat exchange with exhaust gas, but prior to introducing the water into the economizer, warm water from the steam-water drum is mixed into the water to keep the temperature of the water at a setting value for preventing the condensation of the exhaust gas.

CITATION LIST

Patent Literature

Patent 1: JP2015-10798A

SUMMARY

Problems to be Solved

However, in the economizer disclosed in Patent Document 1, since all the feed water to the steam-water drum is introduced into the economizer, as the amount of the feed water increases, it becomes difficult to keep the temperature of the feed water at a setting value by mixing warm water into the feed water, and thus the condensation of the exhaust gas may occur.

In view of the above, an object of at least one embodiment of the present disclosure is to provide an exhaust gas cooler that can suppress the condensation of exhaust gas in the economizer.

Solution to the Problems

An exhaust gas cooler according to at least one embodiment of the present invention comprises; an economizer for heat exchange between exhaust gas and first water; and a feedwater pipe for supplying the first water with second water having a lower temperature than the first water. The second water is divided and supplied to the first water flowing out of the economizer and the first water flowing into the economizer.

With this configuration, since at least part of the second water is supplied to the first water flowing into the economizer, the temperature of the first water flowing into the economizer becomes higher than when the entire amount of the second water is supplied to the first water. Thus, the reduction in exhaust gas temperature by heat exchange between the exhaust gas and the first water in the economizer s suppressed, so that it is possible to suppress the condensation of the exhaust gas in the economizer.

In some embodiments, the exhaust gas cooler may further comprise: a temperature detection member for detecting an inlet temperature which is a temperature of the first water flowing into the economizer; and an inlet-supply-amount control member for controlling an inlet supply amount which is a supply amount of the second water supplied to the first water flowing into the economizer. The inlet-supply-amount control member may be configured to control the inlet supply amount such that the inlet temperature is in a predetermined setting temperature range.

With the above configuration, by appropriately setting the setting temperature range, it is possible to keep the temperature of the exhaust gas above the dew point temperature and reduce a risk of boiling of the first water in the economizer.

In some embodiments, the exhaust gas cooler may further comprise: a steam drum into which the first water flowing out of the economizer is introduced, and part of the second water may be supplied to the first water flowing out of the economizer between the economizer and the steam drum. In this case, the exhaust gas cooler may further comprise an exhaust heat boiler for heating the first water introduced into the steam drum to produce steam, and the exhaust gas may exchange heat with the first water in the exhaust heat boiler before the heat exchange with the first water in the economizer.

When the reduction in exhaust gas temperature by heat exchange between the exhaust gas and the first water in the economizer is suppressed by supplying at least part of the second water to the first water flowing into the economizer, the cooling effect on the exhaust gas is reduced although the condensation of the exhaust gas in the economizer is suppressed. In this regard, with the above configuration, before introducing the exhaust gas into the economizer, the exhaust gas is cooled by the steam generated in the exhaust heat boiler. Thus, the reduction in cooling effect on the exhaust gas can be suppressed by cooling with the exhaust heat boiler and the economizer.

In some embodiments, the exhaust may be exhaust gas from a combustion furnace in an integrated coal gasification combined cycle power plant. The exhaust gas from a combustion furnace in an integrated coal gasification combined cycle power plant contains sulfur trioxide ($SO_3$), and thus has high acid dew point. Accordingly, the exhaust gas is likely to be condensed in the economizer. Condensation of the exhaust gas containing $SO_3$ produces sulfuric acid, which leads to corrosion of the economizer. Therefore, the effect of suppressing condensation of exhaust gas in the economizer is applicable particularly on the exhaust gas cooler of the integrated coal gasification combined cycle power plant.

Advantageous Effects

According to at least one embodiment of the present disclosure, since at least part of the second water is supplied to the first water flowing into the economizer, the temperature of the first water flowing into the economizer becomes higher than when the entire amount of the second water is supplied to the first water. Thus, the reduction in exhaust gas temperature by heat exchange between the exhaust gas and the first water in the economizer is suppressed, so that it is possible to suppress the condensation of the exhaust gas in the economizer.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First Embodiment

The exhaust gas cooler of the present disclosure will be described with reference to an exemplary facility for cooling exhaust gas discharged from a combustion furnace in an integrated coal gasification combined cycle power plant. The exhaust gas cooler of the present disclosure is not limited to such a facility, but may be used in any facility for cooling exhaust gas discharged from any equipment.

Figure 1:
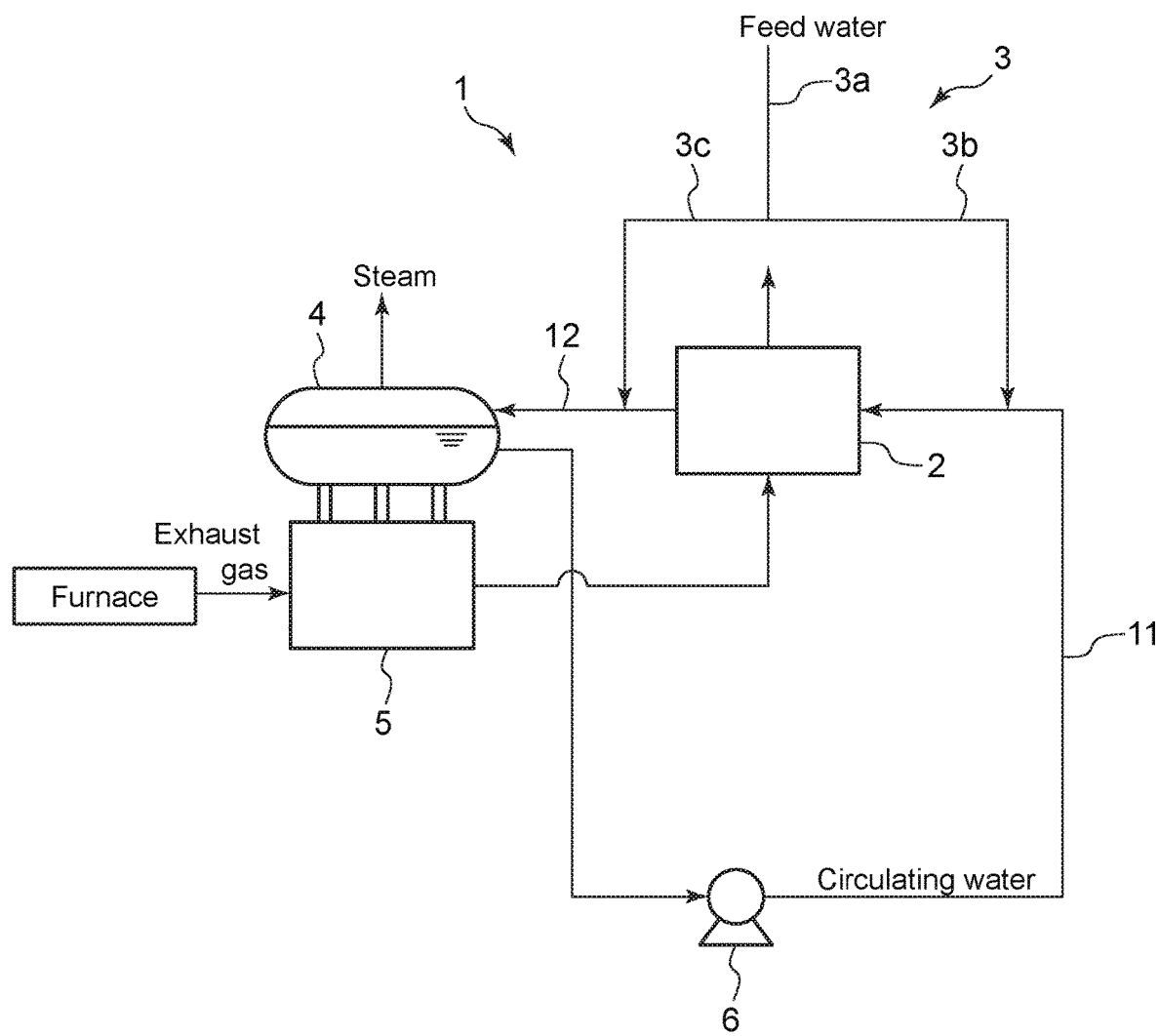
FIG. 1 is a schematic configuration diagram of an exhaust gas cooler according to a first embodiment of the present disclosure.

As shown in FIG. 1, the exhaust gas cooler 1 according to the first embodiment of the present disclosure includes an economizer 2 for heat exchange between exhaust gas and circulating water (first water), and a feedwater pipe 3 (second water supply pipe) for supplying feed water (second water) to the circulating water. The feedwater pipe 3 includes one main pipe 3a and two branch pipes each of which is connected at one end with the main pipe 3a so as to diverge from the main pipe 3a, namely, an upstream branch pipe 3b and a downstream branch pipe 3c, The other end of the upstream branch pipe 3b is connected to a pipe 11 on the upstream side of the economizer 2 in the flow direction of the circulating water. The other end of the downstream branch pipe 3c is connected to a pipe 12 on the downstream side of the economizer 2 in the flow direction of the circulating water.

When the exhaust gas cooler 1 is a facility for cooling exhaust gas from a combustion furnace in an integrated coal gasification combined cycle power plant, the exhaust gas cooler 1 further includes a steam drum 4 communicating with the economizer 2 via the pipe 12, an exhaust heat boiler 5 for heating the circulating water introduced into the steam drum 4 via the pipe 12 to generate steam, and a pump 6 for supplying water in the steam drum 4 to the economizer 2 via the pipe 11 as the circulating water. The exhaust heat boiler 5 is configured to generate steam by heat exchange between the exhaust gas to be introduced into the economizer 2 and the circulating water introduced into the steam drum 4.

Next, operation of the exhaust gas cooler 1 according to the first embodiment will be described.

When the exhaust gas from the combustion furnace is introduced into the exhaust heat boiler 5, heat is exchanged in the exhaust heat boiler 5 between the exhaust gas and water in the steam drum 4 to heat the waxer and generate steam. The steam flows out of the steam drum 4. On the other hand, the pump 6 causes water in the steam drum 4 to flow out through the pipe 11 into the economizer 2 as the circulating water. The exhaust gas from the exhaust heat boiler 5 is introduced into the economizer 2, and heat is exchanged in the economizer 2 between the exhaust gas and circulating water to heat the circulating water. The circulating water heated in the economizer 2 is introduced into the steam drum 4 via the pipe 12.

Since the steam flows out of the steam drum 4, it is necessary to supply the steam drum 4 with the same amount of feed water as the steam that has flowed out. The feed water is supplied via the feedwater pipe 3 to the circulating water that circulates so as to flow out of the steam drum 4 and return to the steam drum 4. Since the feed water is generally cooler than the circulating water, if the entire amount of feed water is supplied to the circulating water flowing into the economizer 2, the temperature of the circulating water flowing into the economizer 2 is significantly decreased. The exhaust gas from the combustion furnace in the integrated coal gasification combined cycle power plant contains $SO_3$ and has high acid dew point. Therefore, if the temperature of the circulating water flowing into the economizer 2 is so low that the temperature of the exhaust gas falls below the acid dew point by heat exchange with the circulating water, the exhaust gas is condensed in the economizer 2. Condensation of the exhaust gas containing $SO_3$ produces sulfuric acid, which leads to corrosion of the economizer 2.

On the other hand, if the entire amount of feed water is supplied to the circulating water flowing out of the economizer 2, the circulating water from the steam drum 4 is introduced into the economizer 2 as it is. Depending on operating conditions of the integrated coal gasification combined cycle power plant, the temperature, and flow rate of the exhaust gas from the combustion furnace and the temperature of the circulating water may change. If the circulating water having a relatively high temperature flows into the economizer 2, or the temperature of the exhaust gas flowing into the economizer 2 is high, or the flow rate of the exhaust gas is large, the circulating water in the economizer 2 may overheat and boil. Since the economizer 2 is often not designed on the assumption that the circulating water boils, the economizer 2 may be damaged when the circulating water boils.

In view of this, in the first embodiment, the feed water is divided so as to flow through the upstream branch pipe 3b and the downstream branch pipe 3c after flowing through the main pipe 3a in the feedwater pipe 3, and introduced into the respective pipes 11 and 12 so as to be supplied to the circulating water flowing into the economizer 2 and the circulating water flowing out of the economizer 2, respectively. Here, assuming normal operating conditions of the integrated coal gasification combined cycle power plant, a certain range can be estimated for each of the temperature and flow rate of the exhaust gas flowing into the economizer 2 and the temperature of the circulating water flowing out of the steam drum 4. By determining the flow rate of the feed water flowing through the upstream branch pipe 3b, that is, the amount of the feed water supplied to the circulating water flowing into the economizer 2 based on these ranges, it is possible to adjust the circulating water flowing into the economizer 2 to an appropriate temperature at which the circulating water does not boil and the exhaust gas does not condense in the economizer 2.

Thus, when at least part of the feed water is supplied to the circulating water flowing into the economizer 2, the temperature of the circulating water flowing into the economizer 2 becomes higher than when the entire amount of the feed water is supplied to the circulating water. Thus, the reduction in exhaust gas temperature by heat exchange between the exhaust gas and the circulating water in the economizer 2 is suppressed, so that it is possible to suppress the condensation of the exhaust gas in the economizer 2.

However, when the reduction in exhaust gas temperature by heat exchange between the exhaust gas and the circulating water in the economizer 2 is suppressed by supplying at least part of the feed water to the circulating water flowing into the economizer 2, the cooling effect on the exhaust gas is reduced although the condensation of the exhaust gas in the economizer 2 is suppressed. In this regard, in the first embodiment, before introducing the exhaust gas into the economizer 2, the exhaust gas is cooled by the steam generated in the exhaust heat boiler 5. Thus, the reduction in cooling effect on the exhaust gas can be suppressed by cooling with the exhaust heat boiler 5 and the economizer 2.

Second Embodiment

Next, the exhaust gas cooler according to the second embodiment will be described. The exhaust gas cooler according to the second embodiment is modified from the first embodiment such that the amount of the feed water supplied to the circulating water is controlled so the temperature of the circulating water flowing into the economizer is in an appropriate range. In the second embodiment, the same constituent elements as those in the first embodiment are associated with the same reference numerals and not described again in detail.

Figure 2:
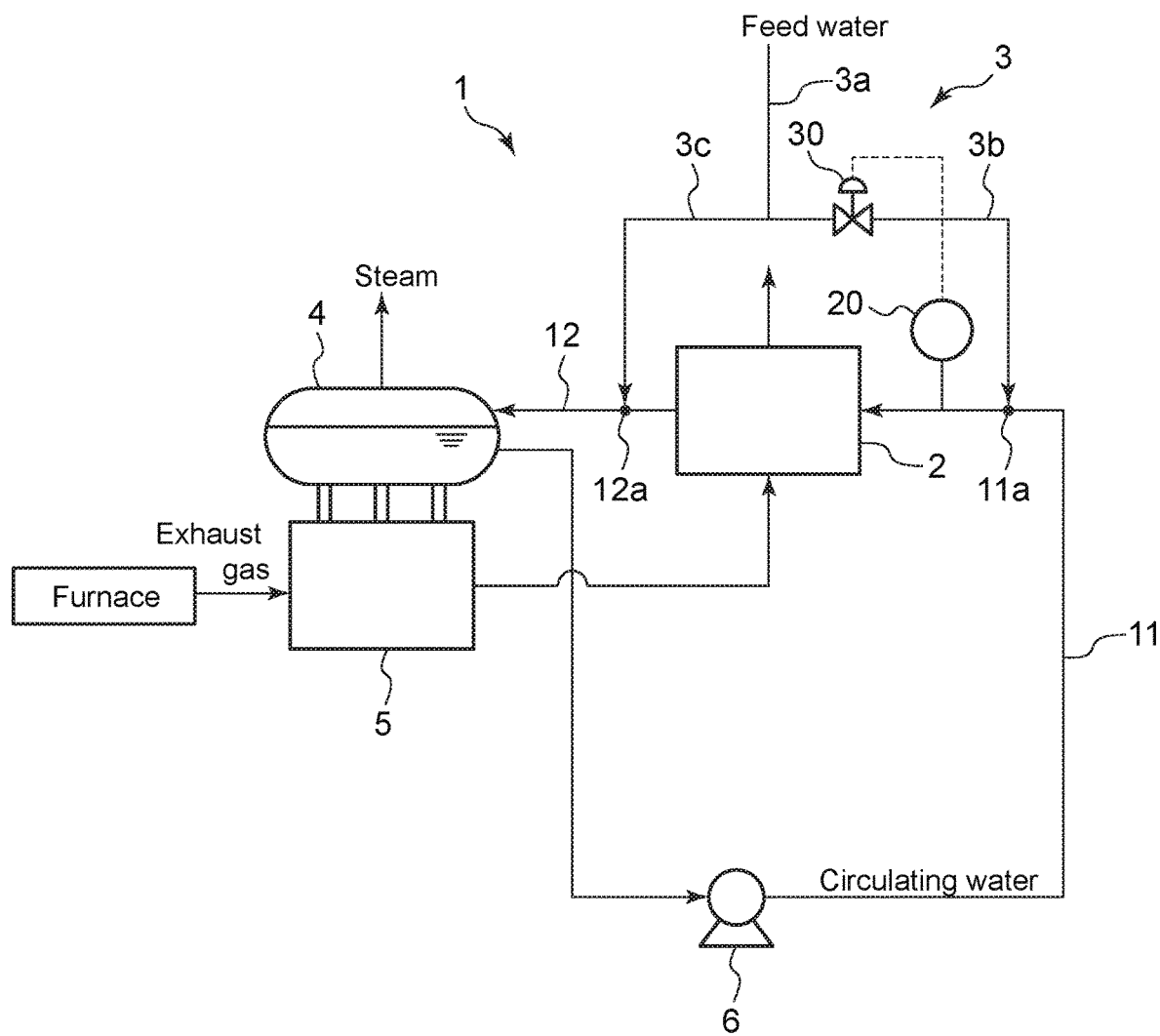
FIG. 2 is a schematic configuration diagram of an exhaust gas cooler according to a second embodiment of the present disclosure.

As shown in FIG. 2, the pipe 11 is provided with, on the downstream side of a connection portion 11*a* between the upstream branch pipe 3*b* and the pipe 11, a temperature sensor 20 (temperature detection member) for detecting an inlet temperature which is the temperature of the circulating water flowing into the economizer 2. The upstream branch pipe 3*b* is provided with a flow-rate control valve 30 (inlet-supply-amount control member) for controlling an inlet supply amount which is the supply amount of the feed water supplied to the circulating water flowing into the economizer 2. The configuration is otherwise the same as that of the first embodiment.

Next, operation of the exhaust gas cooler 1 according to the second embodiment will be described.

The second embodiment is the same as the first embodiment that the condensation of the exhaust gas in the economizer 2 is suppressed by supplying at least part of the feed water to the circulating water flowing into the economizer 2. The second embodiment is different from the first embodiment in that the supply amount of the feed water supplied to the circulating water flowing into the economizer 2 is controlled based on a detection value of the temperature sensor 20. The difference from the first embodiment will be described below.

The flow-rate control valve 30 controls the amount of the feed water flowing through the upstream branch pipe 3*b*, i.e., the amount of the feed water supplied to the circulating water flowing into the economizer 2 by adjusting the opening degree of the valve such that the detection value of the temperature sensor 20 is in a predetermined setting temperature range. The setting temperature range has an upper limit value and a lower limit value. If the detection value of the temperature sensor 20 exceeds the upper limit value, the opening degree of the flow-rate control valve 30 is increased to increase the amount of the feed water supplied to the circulating water flowing into the economizer 2, so that the temperature of the circulating water flowing into the economizer 2 is decreased. Conversely, if the detection value of the temperature sensor 20 falls below the lower limit value, the opening degree of the flow-rate control valve 30 is decreased to decrease the amount of the feed water supplied to the circulating water flowing into the economizer 2, so that the temperature of the circulating water flowing into the economizer 2 is increased.

Figure 3:
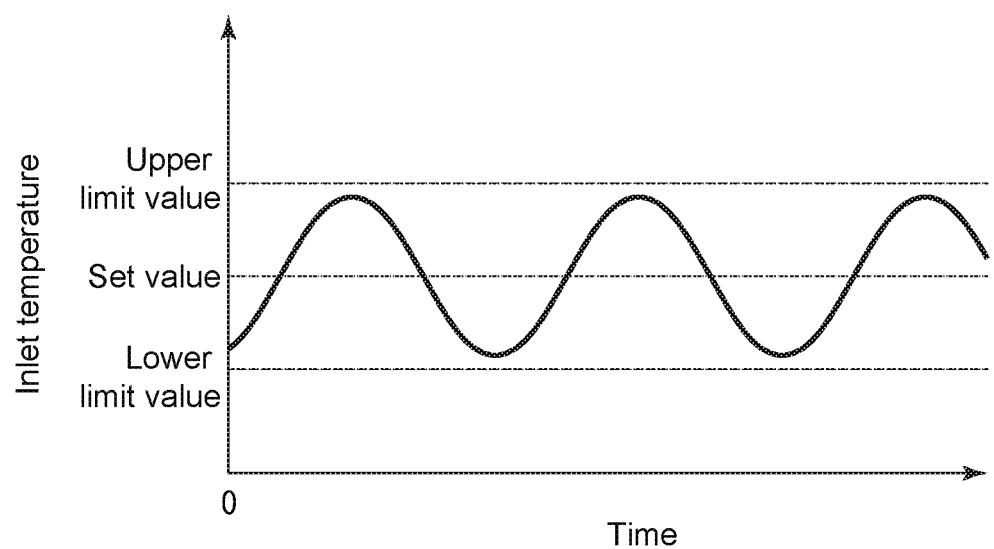
FIG. 3 is a graph showing an example of temporal change in temperature of circulating water flowing into the economizer in the exhaust gas cooler according to the second embodiment of the present disclosure.

As shown in FIG. 3, with this operation, the detection value of the temperature sensor 20, i.e., the temperature of the circulating water flowing into the economizer 2 is kept between the upper limit value and the lower limit value of the setting temperature range.

Here, the upper limit value of the setting temperature range is the maximum value of temperature that avoids boiling of the circulating water due to heat exchange with the exhaust gas in the economizer 2. Meanwhile, the lower limit value of the setting temperature range is the minimum value of temperature that avoids dew condensation of the exhaust gas due to heat exchange with the circulating water in the economizer 2. By appropriately setting the setting temperature range in this way, it is possible to keep the temperature of the exhaust gas above the dew point temperature and reduce a risk of boiling of the circulating water in the economizer 2.

In second embodiment, the flow-rate control valve 30 is disposed on the upstream branch pipe 3*b*, but it may be disposed on the downstream branch pipe 3*c*. Since the feed water flowing through the main pipe 3*a* is divided into the upstream branch pipe 3*b* and the downstream branch pipe 3*c*, the amount of the feed water flowing through the downstream branch pipe 3*c* can be controlled by controlling the amount of the feed water flowing through the upstream branch pipe 3*b*.

In the second embodiment, the temperature detection member is the temperature sensor 20, but it is not limited to the temperature sensor. If the inlet temperature, which is the temperature of the circulating water flowing into the economizer 2, can be estimated or calculated from the operating state of the integrated coal gasification combined cycle power plant, for example, the temperature detection member may be an estimation member or a calculation member which estimates or calculates the inlet temperature. Further, when the heat exchange amount of the economizer 2 can be estimated under normal operating conditions of the integrated coal gasification combined cycle power plant, the inlet temperature, which is the temperature of the circulating water flowing into the economizer 2, can be estimated by detecting the temperature of the circulating water flowing out of the economizer 3. In this case, even if the temperature sensor 20 is disposed on the pipe 12, the inlet temperature, which is the temperature of the circulating water flowing into the economizer 2, can be detected by correcting the detection value of the temperature sensor 20. Thus, the temperature sensor 20 may be disposed, downstream of the connection portion 11*a* between the upstream branch pipe 3*b* and the pipe 11 in the circulating water flow direction, on the pipe 12.

REFERENCE SIGNS LIST

1 Exhaust gas cooler
2 Economizer
3 Feedwater pipe
3*a* Main pipe
3*b* Upstream branch pipe
3*c* Downstream branch pipe
4 Steam drum
5 Exhaust heat boiler
6 Pump
11 Pipe 11a Connection portion
12 Pipe
12a Connection portion
20 Temperature sensor (Temperature detection member)
30 Flow-rate control valve (Inlet supply amount control member)

The invention claimed is:
1. An exhaust gas cooler comprising:
a steam drum containing first water;
an exhaust heat boiler for heating the first water in the steam drum to produce steam by heat exchange between the first water and exhaust gas;
an economizer for heat exchange between the exhaust gas, after the heat exchange between the first water and the exhaust gas, and the heated first water supplied from the steam drum;
a feedwater pipe for supplying the first water with second water having a lower temperature than the first water;
a temperature detection member that detects an inlet temperature, which is a temperature of the first water flowing into the economizer; and
an inlet-supply-amount control member that controls an inlet supply amount, which is a supply amount of the second water supplied to the first water flowing into the economizer,
wherein the exhaust gas cooler is configured such that the first water flowing out of the economizer is introduced into the steam drum,
wherein the second water is divided and supplied to the first water flowing out of the economizer and the first water flowing into the economizer, and
wherein the inlet-supply-amount control member controls the inlet supply amount such that the inlet temperature is in a predetermined setting temperature range.
2. The exhaust gas cooler according to claim 1,
wherein part of the second water is supplied to the first water flowing out of the economizer between the economizer and the steam drum.
3. The exhaust gas cooler according to claim 1,
wherein the exhaust gas is exhaust gas from a combustion furnace in an integrated coal gasification combined cycle power plant.

* * * * *